United States Patent
Weymer et al.

(10) Patent No.: US 6,694,702 B2
(45) Date of Patent: Feb. 24, 2004

(54) DOOR CONSTRUCTION AND METHOD

(75) Inventors: Paul P. Weymer, Niles, OH (US); David A. Nist, Niles, OH (US)

(73) Assignee: Amweld Building Products, LLC, Garrettsville, OH (US)

( * ) Notice: Subject to any disclaimer, the term of this patent is extended or adjusted under 35 U.S.C. 154(b) by 0 days.

(21) Appl. No.: 09/995,484

(22) Filed: Nov. 28, 2001

(65) Prior Publication Data
US 2002/0050050 A1 May 2, 2002

Related U.S. Application Data

(62) Division of application No. 09/658,626, filed on Sep. 8, 2000.
(60) Provisional application No. 60/153,421, filed on Sep. 10, 1999.

(51) Int. Cl.[7] .............................. E04C 1/00; E04C 2/54
(52) U.S. Cl. .................. 52/784.1; 52/309.9; 52/309.15
(58) Field of Search ............................ 52/309.8, 309.9, 52/309.15, 455, 457, 783.12, 784.1

(56) References Cited

U.S. PATENT DOCUMENTS

| | | | |
|---|---|---|---|
| 445,262 A | | 1/1891 | Kinnear |
| 993,457 A | * | 5/1911 | Nelson .......................... 52/455 |
| 1,091,905 A | * | 3/1914 | Zahner .......................... 52/457 |
| 1,410,539 A | * | 3/1922 | Wine .............................. 52/457 |
| 1,680,538 A | * | 8/1928 | Gross ......................... 52/783.12 |
| 1,761,037 A | * | 6/1930 | Gross ......................... 52/783.12 |
| 3,546,845 A | * | 12/1970 | Kempel ..................... 52/783.19 |
| 3,868,796 A | * | 3/1975 | Bush ......................... 52/783.12 |
| 3,950,894 A | * | 4/1976 | DiMaio ......................... 49/501 |
| 3,987,588 A | | 10/1976 | Imperial et al. |
| 4,002,000 A | | 1/1977 | Howard et al. |
| 4,546,585 A | * | 10/1985 | Governale ................. 52/309.11 |
| 5,142,835 A | * | 9/1992 | Mrocca ..................... 52/309.12 |
| 5,167,105 A | * | 12/1992 | Isban et al. .................... 52/455 |
| 5,177,868 A | | 1/1993 | Kyle et al. |
| 5,293,728 A | | 3/1994 | Christopher et al. |
| 5,359,872 A | | 11/1994 | Nashiki |
| 5,361,552 A | * | 11/1994 | Fulford ........................ 52/455 |
| 5,656,184 A | | 8/1997 | Jones et al. |
| 5,887,398 A | * | 3/1999 | Chen ......................... 52/309.9 |
| 5,897,796 A | | 4/1999 | Forrest |
| 5,914,078 A | | 6/1999 | Morrison |
| 6,092,343 A | * | 7/2000 | West et al. ............... 52/309.11 |
| 6,311,454 B1 | * | 11/2001 | Kempel ..................... 52/784.15 |
| 6,351,882 B1 | * | 3/2002 | Weymer et al. .............. 29/458 |

FOREIGN PATENT DOCUMENTS

| | | |
|---|---|---|
| GB | 2301085 A | 11/1996 |
| JP | 403146226 A | 6/1991 |

OTHER PUBLICATIONS

PCT/US00/40849—International Search Report.

* cited by examiner

Primary Examiner—Brian E. Glessner
Assistant Examiner—Kevin McDermott
(74) Attorney, Agent, or Firm—Fay, Sharpe, Fagan, Minnich & McKee, LLP

(57) ABSTRACT

A door construction includes first and second door blanks each defining an L-shaped profile including: (i) a back member; (ii) a base member. The blanks are secured in opposed nesting relation to define first and second seams. The first and second seams. The first and second base members define edges of the door. The base member of the first blank defines a foot including a first contact surface and the back member of the first blank is folded upon itself to define a second contact surface. The base of the second blank defines a foot including a third contact surface and the back member of the second blank is folded upon itself to define a fourth contact surface. The first seam is defined at the abutment of the first and fourth contact surfaces, and the second seam is defined at the abutment of the second and third contact surfaces.

7 Claims, 5 Drawing Sheets

DOOR CONSTRUCTION AND METHOD

CROSS-REFERENCE TO RELATED APPLICATION

This application is a divisional of and claims priority from U.S. application Ser. No. 09/658,626 filed Sep. 8, 2000, which claims benefit of the filing date and priority from U.S. provisional application serial No. 60/153,421 filed Sep. 10, 1999.

BACKGROUND OF THE INVENTION

The present invention relates to a new and improved door construction and method of manufacturing same. More particularly, the invention relates to a construction for a metal door that is easy to manufacture and that results in a finished door having improved strength and pleasing aesthetics relative to prior metal doors fabricated using conventional techniques. The subject new door also readily facilitates attachment of conventional hardware, such as hinges, latches and the like to the edges thereof.

Conventional metal doors are well-known and commonly encountered in both commercial and residential applications. These prior metal doors are typically comprised of inner and outer door panels separated on opposite lateral sides by edges that maintain the panels in parallel spaced relation to each other. The space between the inner and outer panels may be empty or may be filled with insulation, ballast or other suitable core material.

Metal doors of the type described are fabricated by various manufacturing techniques, including mechanical attachment, lock seams, intermittent resistance welding, and continuous wire welding. These techniques have been found to result in a sub-optimal door constructions. The current fabrication methods typically result in the formation of a longitudinally extending seam bisecting or otherwise interrupting each edge of the door. This seam, owing to its central or other intrusive location along the entire longitudinal extent of each door edge, has been found to be unsightly, specifically at areas of hardware attachment. Moreover, the seam renders hardware installation difficult and less precise given that many hinges, latches and other hardware components require placement of a fastener and/or formation of an aperture directly through the seam region.

Furthermore, conventional welding operations have been found to form visible blemishes on a door that must be removed or disguised prior to sale and use of the door. Also, because some welding operations result in discontinuous weld seams, the strength of the resulting door is compromised.

Beyond the characteristics of the resulting door, known metal door construction techniques have been found to be deficient. Most notably, the construction methods are overly time-consuming and labor-intensive to be fully cost effective.

In light of the foregoing specifically noted deficiencies and others, a need has been identified for an alternative metal door construction and method of manufacturing same. Such construction and method should result in a door having opposed lateral edge regions both free of a central or otherwise intrusive seam so that the door exhibits improved aesthetics and is well-suited for ease of installation of conventional hardware. The door should also possesses improved strength and appearance characteristics.

SUMMARY OF THE INVENTION

In accordance with the present invention, a new and improved door construction and method of manufacturing same are advantageously provided. The door includes first and second formed door panels, each having an identical or substantially similar L-shaped profile defined by an elongated back portion and a relatively shorter base portion. The first and second formed door panels are placed in opposed nesting relation so that the back portions and the base portions are arranged in opposed facing relation to each other. A hollow region is thus defined by and between the first and second formed door panels. The panels are temporarily held in alignment to each other in this relationship by an adhesive, preferably through use of a suitable internal core material secured between the panels by the adhesive. The panels are thereafter permanently joined by laser welding performed along first and second seams. In particular, the first seam is formed at the abutment of the base of the first panel with the back of the second panel, and the second seam is formed at the abutment of the base of the second panel with the back of the first panel. The first seam is disposed along a first lateral edge of the door construction immediately adjacent the back portion of the second panel. The second seam is disposed along a second lateral edge of the door construction immediately adjacent the back portion of the first panel. This arrangement results in substantially uninterrupted first and second door edges defined by the base portions of the first and second L-shaped door panels.

One advantage of the invention resides in the provision of a new and improved door construction and method.

Another advantage of the invention is found in a new door construction wherein the opposed edges of the door are substantially uninterrupted by continuously welded seams.

A further advantage of the invention is the provision of a door construction where first and second door defining panels are welded together along at least substantial portions of their lengths by continuous, uninterrupted welds.

Yet another advantage of the invention is found in a new door construction that exhibits no welding blemishes incurred during the manufacturing process.

Still another advantage of the invention resides in a new and improved door construction method that is more efficient and cost effective compared to conventional welded door construction methods.

A still further advantage of the present invention is found in the provision of a new and improved door construction adapted to receive all associated lock assemblies in one door panel with very close tolerances which results in an exceptionally close precision fit for all locking hardware.

Still other benefits and advantages of the invention will become apparent to those of ordinary skill in the art upon reading and understanding the following specification.

BRIEF DESCRIPTION OF THE DRAWINGS

The invention may take form in various components and arrangements of components, and various of steps and arrangements of steps, preferred embodiments of which are illustrated in the accompanying drawings that form a part hereof and wherein.

DETAILED DESCRIPTION OF THE PREFERRED EMBODIMENTS

Figure 1:
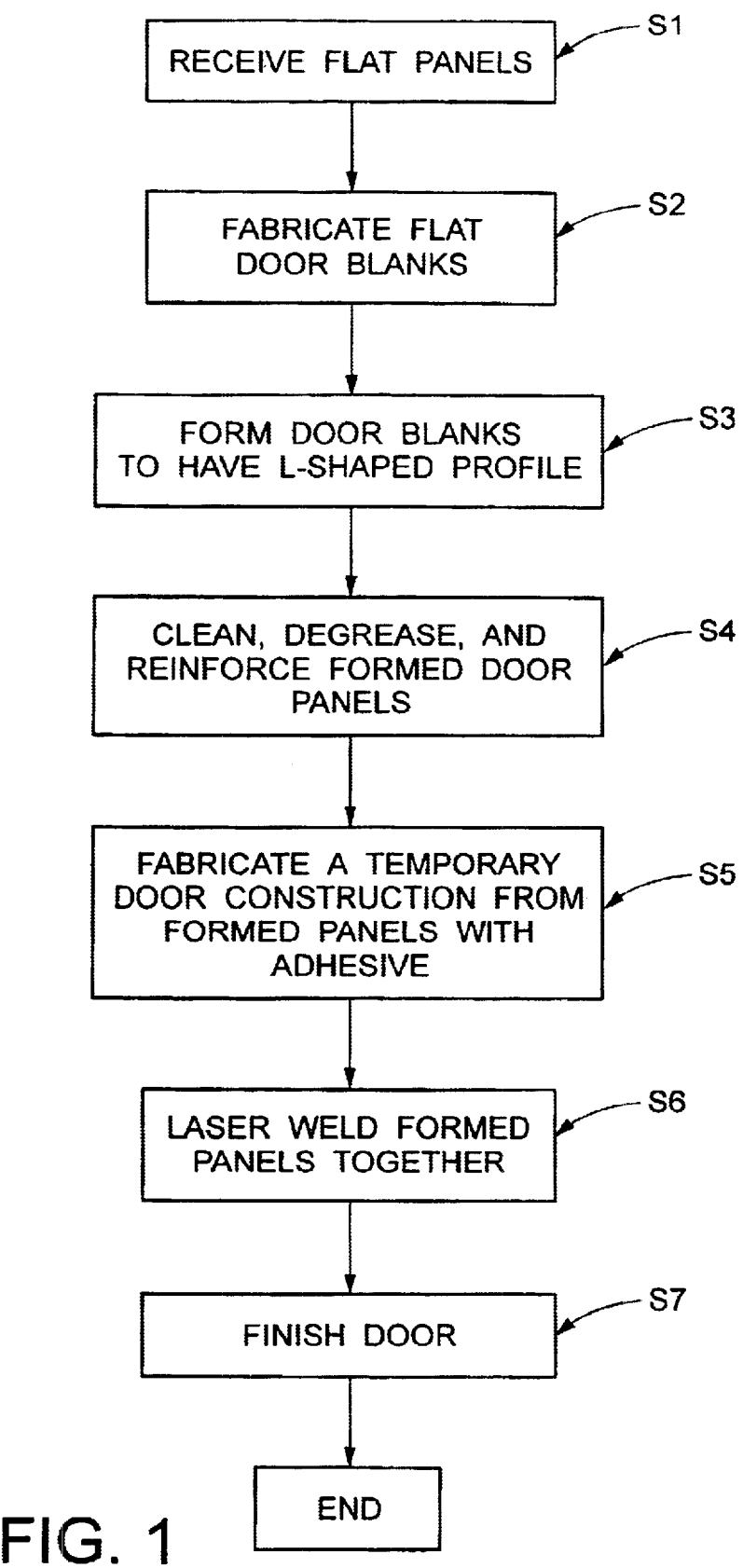
FIG. 1 is a flow-chart illustrating a method of constructing a door in accordance with the present invention.
Figure 2:
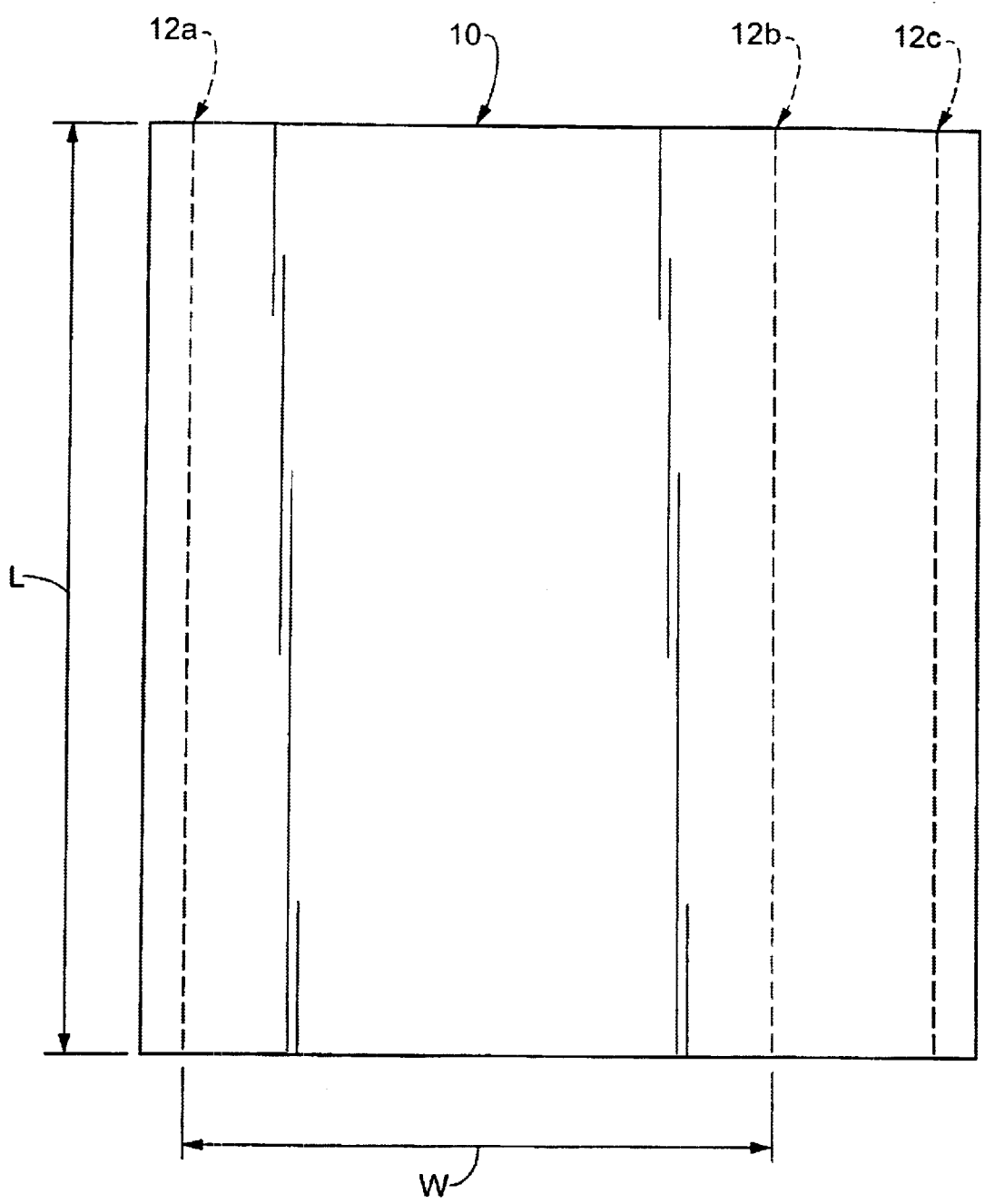
FIG. 2 is a plan view of a door blank used in forming a door panel in accordance with the invention.

Referring now to the FIGURES wherein the showings are for purposes of illustrating preferred embodiments of the invention only and not for purposes of limiting same, FIG. 1 provides an overview of a door construction method contemplated by the present invention. In general, the method includes: (S1) receiving flat metal panels; (S2) fabricating flat door blanks from the flat panels; (S3) forming the door blank to have a substantially L-shaped profile; (S4) cleaning, degreasing, and reinforcing the formed door panels; (S5) fabricating a temporary door construction from the formed door panels with adhesive; (S6) laser welding the formed door panels of the temporary door construction together to form a door construction; and, (S7) finishing the door construction.

With reference also to FIGS. 2–5, implementation of the method schematically illustrated in FIG. 1 is discussed in further detail. Flat metal panels, preferably cold rolled or A60 galvanealed steel having a thickness in the range of 0.019"–0.070" (24 gauge–14 gauge) are received and fed to a press or the like to form flat door blanks 10. The door blanks 10 may be any suitable size and shape as desired to form a door construction having predetermined desired dimensional characteristics.

Figure 3:
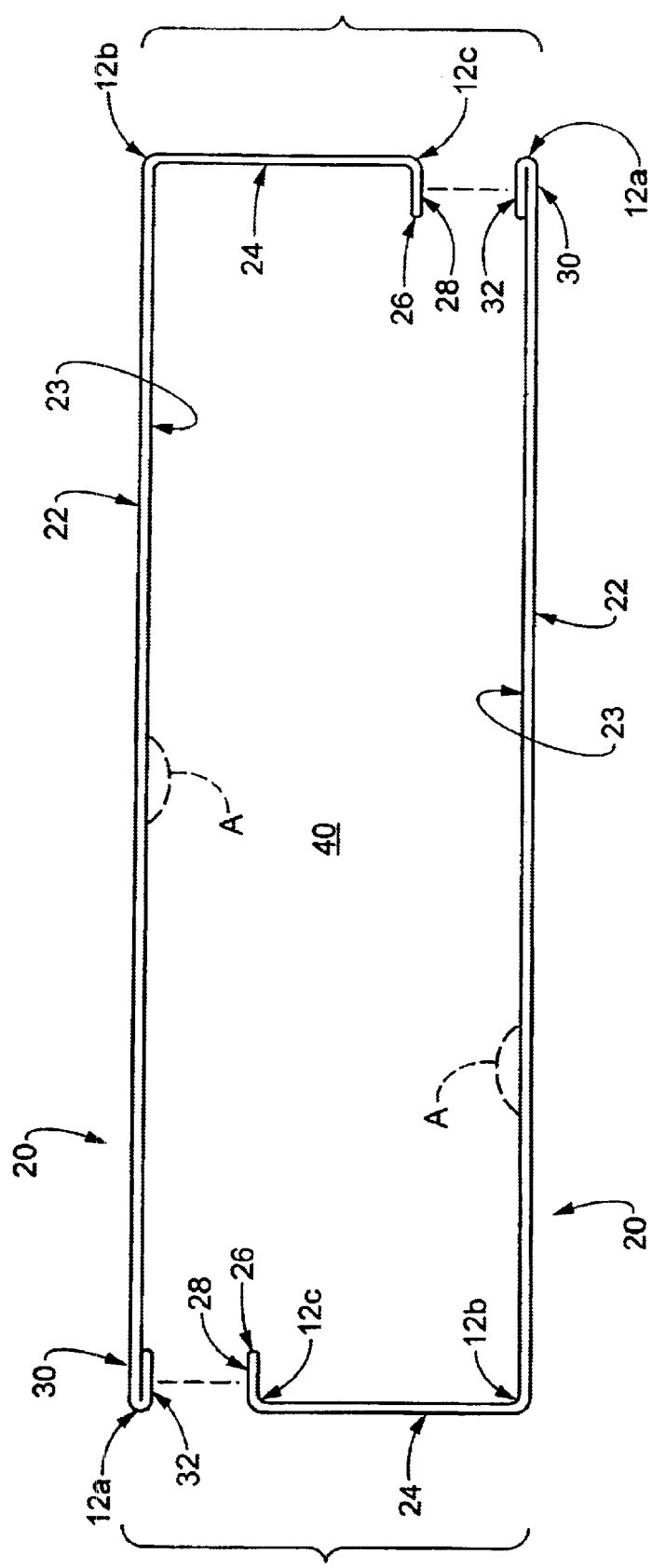
FIG. 3 is an exploded end view showing two formed door panels as they are secured together to form a temporary door construction in accordance with the invention.

The door blanks 10 are then fed to a press that forms each of the blanks into a formed door panel 20 (FIG. 3). In particular, the door blanks 10 are fed to a rotary bending press that bends each blank at the regions 12a,12b,12c, thus resulting in a formed door panel 20. As shown, the door blank 10 is bent approximately 90° at the regions 12b,12c, and crimped at the region 12a. The formed panel 20 thus has an overall L-shaped cross-section or profile, defined by an elongated back member 22 and a relatively shorter base member 24 projecting outwardly from the back member 22 at a first end thereof. The base member 24 preferably includes an upturned foot 26 at its distal end that defines an outwardly facing surface 28 arranged parallel to the elongated back member 22. A second end 30 of the elongated back member opposite the first end from which the base member 24 projects, is preferably folded upon itself and crimped at region 12a to ensure that the end 30 is square and suitably formed for laser welding. The crimped end 30 presents an inner face 32 that lies parallel to or otherwise conforms to the face 28 of the foot 26.

Those of ordinary skill in the art will recognize that the base portion 24 of a formed door panel 20 need not project at a right-angle from the elongated back member 22. If desired, the base member 24 may project from the back member 22 at an angle greater or less than 90° without departing from the overall intent or scope of the present invention. Such arrangement is still deemed to form an L-shaped panel 20 as defined herein.

Once door panels 20 are formed as desired, they are cleaned and degreased. If necessary or appropriate, reinforcing members, such as gussets, tapping plates, and/or the like, may be welded, adhered, or otherwise affixed to each formed door panel 20 where desired.

As illustrated in FIG. 3, two door panels 20 are arranged into a door construction by placing the panels 20 in opposed nesting relation—so that the elongated back members 22 thereof are disposed in opposed facing relation, and so that the base members 24 of the panels 20 are likewise situated relative to each other.

More specifically, to assemble a door construction in accordance with a preferred embodiment of the present invention, two formed panels are abutted so that the outer surface 28 of each foot 26 contacts the face 32 of the other panel 20. Prior to abutment of the panels 20, an adhesive generally designated A (FIG. 3) is applied in the form of a bead along the interior face 23 of each panel 20. A core material 80 (FIG. 5) is placed between the panels 20 when they are abutted and is secured to each panel 20 by the adhesive A. This, then, causes the door panels 20 to be adhesively secured in the desired position relative to each other, and to form a temporary door construction 50 (FIG. 4) having a first seam 52 and a second seam 54. Of course, those of ordinary skill in the art will recognize that the adhesive may be applied to one or both of the panels 20 at locations other than that specifically noted (e.g., along the faces 28 and/or 32) to secure the panels in relation to each other prior to welding without departing from the overall scope and intent of the present invention. The temporary door construction 50 has a length equal to the length L of the blank 10, and a width W (FIG. 4) equal to the distance between the regions 12a,12b of the blank 10.

Figure 4:
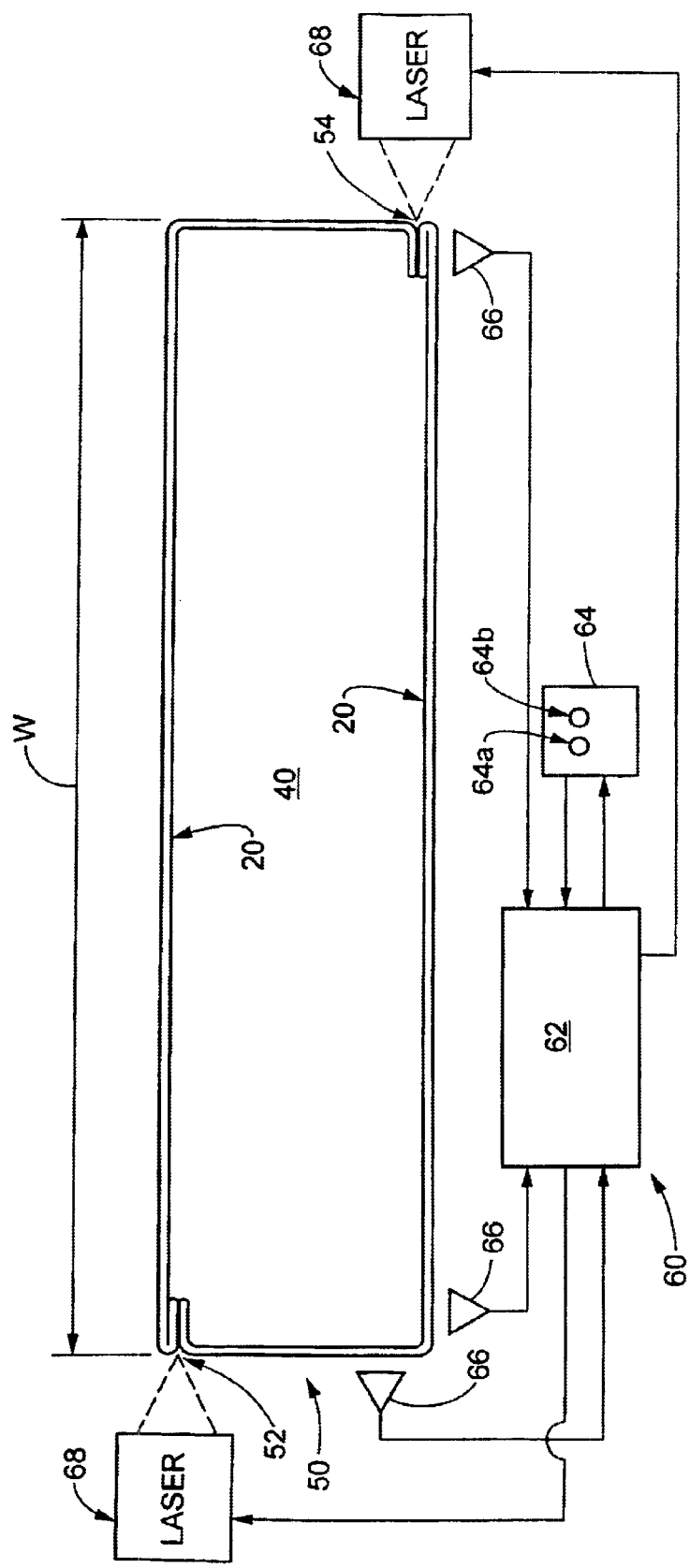
FIG. 4 is an end view of the temporary door construction of FIG. 3 as it is subjected to a laser welding process to form a door construction in accordance with the invention; and, FIG. 5 is an end view of the door construction of FIG. 4 following completion of the laser welding process and insertion of optional interior cores.

With continuing reference to FIG. 4, a laser welding system 60, such as a 6000 Watt transfer flow $CO_2$ laser or other suitable laser welding apparatus, is then used to permanently join the panels 20 of door construction 50 along the first and second seams 52,54. Preferably, the laser weld is effected along the entire length of each seam 52,54. System 60 does not itself form a part of the present invention as such systems are commercially available in the marketplace.

The laser welding system 60 comprises a control system 62 that receives input from and provides output to an operator control panel 64. The control system 62 also provides output signals to the laser welding heads 68 for controlling same. The operator panel 64 includes suitable input switches, keypads or other devices 64a for operator input of information such as the gauge and type of material from which the panels 20 are defined. The input devices 64a can also be used to input parameters such as the length L and width W of the temporary door construction 50 to be welded by the system 60. The control panel 64 further includes output lights, gauges, and/or displays 64b to provide the system operator with feedback and status information on system operation.

Preferably, an operator need not use the control panel 64 to provide the control system 62 with the length L and width W of the temporary door construction 50. Instead, the system 60 preferably comprises contact or non-contact sensors 66 of any suitable type for sensing the length L and width W of the temporary door construction 50 prior to commencement of and/or during actual laser welding operations. As shown in FIG. 4, the sensors 66 input length and width information into the control system 62 that, in turn, outputs control signals to the laser welding heads 68 to control operation of same.

Figure 5:
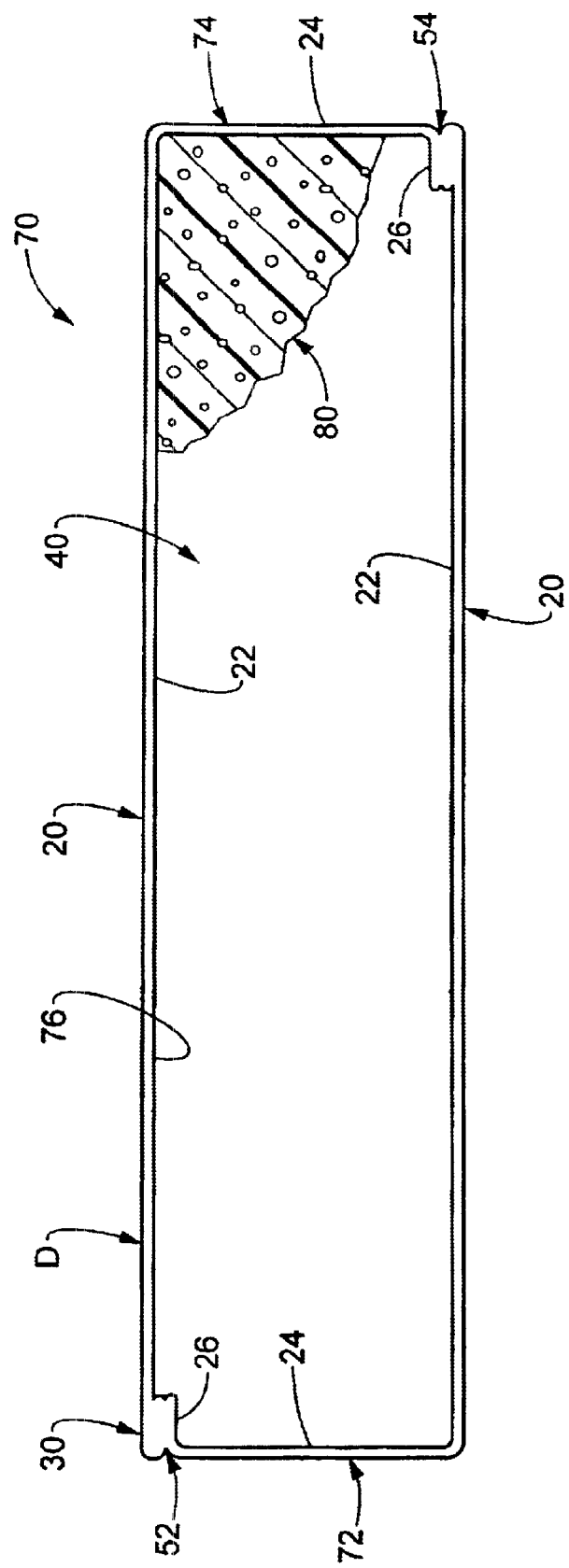

Completion of the laser welding operation S6 results in the formation of a door construction 70 formed in accordance with the present invention as illustrated in FIG. 5. The first and second panels 20 are integrally joined along the length of the first and second seams 52,54. The door thus includes first and second lateral edges 72,74 that are planar and uninterrupted by the seams 52,54. As noted above, it is preferred that an insulation/core material, such as polystyrene, paper honeycomb, urethane foam and/or glass fibers 80, be used to fill the hollow region 40 defined between the joined panels 20. The door construction 70 is in condition for finishing in a conventional manner.

Typically, end caps are installed on the opposite open ends 76 (only one end illustrated, the other being identical) to completely seal the interior region 40. Also, various conventional hardware may be attached to the edges 72,74 and/or mounting locations for same may easily be formed in the edges. Of course, the door construction may also be coated and otherwise finished in a conventional manner.

The invention has been described with reference to preferred embodiments. Of course, modifications and alterations will occur to others upon a reading and understanding of the preceding specification. It is intended that the invention be construed as including all such modifications and alterations.

Having thus described the preferred embodiments, what is claimed is:

1. A door construction comprising:

first and second door blanks each having a length, a width, and each defining an L-shaped profile comprising: (i) a back member; and, (ii) a base member projecting outwardly away from said back member, said first and second door blanks arranged and fixedly secured together in opposed nesting relation with said base member of each of said first and second blanks abutting said back member of the other of said first and second blanks to define respective first and second seams, said first and second base members defining opposite lateral edges of said door construction, wherein:

said first blank, at a distal end of said base member, defines a foot including a first contact surface oriented outwardly away from said back member of said first blank;

said first blank, at a second end of said back member spaced from said base member, is folded upon itself to define a second contact surface;

said second blank, at a distal end of said base member, defines a foot including a third contact surface oriented outwardly away from said back member of said second blank;

said second blank, at a second end of said back member spaced from said base member, is folded upon itself to define a fourth contact surface;

said first seam is defined at an abutment of said first and fourth contact surfaces; and, said second seam is defined at an abutment of said second and third contact surfaces.

2. The door construction as set forth in claim 1, wherein said first, second, third, and fourth contact surfaces are all parallel to each other and to said respective back members of said first and second blanks.

3. The door construction as set forth in claim 1, further comprising:

a core member located in a space defined between said first and second blanks; and, first and second beads of adhesive located respectively between said core member and said first and second blanks, said first and second beads of adhesive bonding said core member to said first and second blanks, respectively.

4. The door construction as set forth in claim 3, wherein said core member comprises at least one of polystyrene foam, paper honeycomb, urethane foam, and glass fibers.

5. The door construction as set forth in claim 3, wherein said first and second blanks are fixedly secured together by respective first and second welds located at said first and second seams.

6. The door construction as set forth in claim 5, wherein said first and second welds are continuous and uninterrupted and are coextensive with the first and second seams.

7. The door construction as set forth in claim 3, wherein said opposite lateral edges are planar.

* * * * *